(12) United States Patent
Tantot (10) Patent No.: US 11,485,506 B2
(45) Date of Patent: Nov. 1, 2022

(54) AIRCRAFT INCLUDING A DUCTED REAR THRUSTER WITH AN INPUT STATOR HAVING MOVABLE FLAPS

(71) Applicant: SAFRAN AIRCRAFT ENGINES, Paris (FR)

(72) Inventor: Nicolas Jérôme Jean Tantot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 389 days.

(21) Appl. No.: 15/745,691

(22) PCT Filed: Jul. 21, 2016

(86) PCT No.: PCT/FR2016/051886
§ 371 (c)(1),
(2) Date: Jan. 17, 2018

(87) PCT Pub. No.: WO2017/013364
PCT Pub. Date: Jan. 26, 2017

(65) Prior Publication Data
US 2018/0209445 A1    Jul. 26, 2018

(30) Foreign Application Priority Data

Jul. 22, 2015 (FR) ..................... 1556956

(51) Int. Cl.
*B64D 27/20* (2006.01)
*F04D 29/68* (2006.01)
(Continued)

(52) U.S. Cl.
CPC ............ *B64D 27/20* (2013.01); *B64D 29/04* (2013.01); *B64D 33/02* (2013.01); *F01D 9/06* (2013.01);
(Continued)

(58) Field of Classification Search
CPC ........ B64D 27/20; B64D 27/08; B64D 27/14; B64D 33/02; B64D 2033/0226; F02C 7/042
See application file for complete search history.

(56) References Cited

U.S. PATENT DOCUMENTS 502,168 A * 7/1893 Battey .................... B64D 27/20
244/74
3,366,350 A 1/1968 Hoffert et al.
(Continued)

FOREIGN PATENT DOCUMENTS

EP  1566522 A1  8/2005
FR  1339141 A  10/1963
(Continued)

OTHER PUBLICATIONS

International Search Report dated Oct. 25, 2016, issued in corresponding International Application No. PCT/FR2016/051886, filed Jul. 21, 2016, 3 pages.
(Continued)

*Primary Examiner* — Richard R. Green
*Assistant Examiner* — William L Gmoser
(74) *Attorney, Agent, or Firm* — Christensen O'Connor Johnson Kindness PLLC (57) ABSTRACT

An aircraft including a fuselage and a propulsion assembly. The propulsion assembly includes at least one fan rotor placed behind the fuselage as an extension thereof along a longitudinal axis, and a nacelle which forms a fairing of the at least one fan rotor through which at least one air flow passes. The aircraft comprises a plurality of stator radial arms mounted upstream of the at least one fan rotor and extending between the fuselage and the nacelle. The radial arms comprise at least one variable-pitch movable portion configured to axially divert the air flow.

23 Claims, 4 Drawing Sheets

(51) Int. Cl.
*F01D 17/16* (2006.01)
*F04D 29/54* (2006.01)
*F01D 9/06* (2006.01)
*F02K 3/062* (2006.01)
*F04D 29/56* (2006.01)
*B64D 29/04* (2006.01)
*B64D 33/02* (2006.01)
*F02K 3/072* (2006.01)

(52) U.S. Cl.
CPC ............ *F01D 17/162* (2013.01); *F02K 3/062* (2013.01); *F02K 3/072* (2013.01); *F04D 29/542* (2013.01); *F04D 29/563* (2013.01); *F04D 29/684* (2013.01); *B64D 2033/0226* (2013.01); *F05D 2220/323* (2013.01); *F05D 2220/327* (2013.01); *F05D 2260/57* (2013.01); *Y02T 50/60* (2013.01)

(56) References Cited

U.S. PATENT DOCUMENTS

| | | | | |
|---|---|---|---|---|
| 3,563,500 | A * | 2/1971 | Fischer | B64D 27/02 244/65 |
| 3,568,694 | A * | 3/1971 | Johnson | B64D 33/02 137/15.1 |
| 3,664,612 | A * | 5/1972 | Skidmore | B64D 33/02 244/53 B |
| 3,667,704 | A * | 6/1972 | Assmann | B64D 33/02 244/53 B |
| 4,307,743 | A * | 12/1981 | Dunn | B64D 33/02 137/15.1 |
| 7,299,621 | B2 | 11/2007 | Bart et al. | |
| 8,960,592 | B1 * | 2/2015 | Windisch | A63H 30/04 244/12.5 |
| 2010/0044502 | A1 * | 2/2010 | Cazals | B64D 27/20 244/54 |
| 2012/0145824 | A1 * | 6/2012 | Bensilum | B64C 21/04 244/54 |
| 2014/0182695 | A1 * | 7/2014 | Alvi | F15D 1/008 137/13 |
| 2014/0219772 | A1 | 8/2014 | Nordeen et al. | |
| 2015/0291285 | A1 * | 10/2015 | Gallet | F01D 13/02 415/60 |
| 2015/0298794 | A1 * | 10/2015 | Suciu | B64C 5/06 244/45 R |
| 2016/0069205 | A1 * | 3/2016 | Lecordix | F01D 17/162 415/1 |
| 2016/0177823 | A1 * | 6/2016 | Younes | B64D 33/02 95/12 |
| 2016/0214727 | A1 * | 7/2016 | Hamel | B64D 27/18 |
| 2016/0332741 | A1 * | 11/2016 | Moxon | B64C 15/00 |

FOREIGN PATENT DOCUMENTS

| | | |
|---|---|---|
| FR | 1472962 A | 3/1967 |
| FR | 2949754 A1 | 3/2011 |
| FR | 2997681 A1 | 5/2014 |

OTHER PUBLICATIONS

Written Opinion of the International Searching Authority dated Oct. 25, 2016, issued in corresponding International Application No. PCT/FR2016/051886, filed Jul. 21, 2016, 6 pages.

Written Opinion of the International Searching Authority dated Oct. 25, 2016, issued in corresponding International Application No. PCT/FR2016/051886, filed Jul. 21, 2016, 7 pages.

International Preliminary Report on Patentability dated Jan. 23, 2018, issued in corresponding International Application No. PCT/FR2016/051886, filed Jul. 21, 2016, 1 page.

\* cited by examiner

AIRCRAFT INCLUDING A DUCTED REAR THRUSTER WITH AN INPUT STATOR HAVING MOVABLE FLAPS

FIELD OF THE INVENTION AND PRIOR ART

This invention relates to an aircraft, such as an aeroplane, in particular a civilian aeroplane, propelled by one or more fans placed downstream of the fuselage, and more particularly the case wherein the fans are ducted by a nacelle. The invention relates to means for distributing the airflow entering into said nacelle.

The type of turbine engine having a fan at the rear of the fuselage can be found, for example, in an aircraft architecture proposed in the patent applications FR-A1-2 997 681 and FR-A-1 339 141. In this case, the turbine engine is incorporated in the continuation of the fuselage downstream thereof, in order to reduce the noise pollution and fuel consumption of the aircraft by limiting aerodynamic drag by absorption of the boundary layer.

In such an architecture, an aircraft is propelled by a turbine engine having ducted contra-rotating fans, the turbine engine being incorporated at the rear of the fuselage of the aircraft. In general, the turbine engine comprises at least two gas generators which feed a power turbine having two contra-rotating rotors for driving two fans positioned downstream of the gas generators. The gas generators have distinct lateral air intakes to feed each gas generator.

Downstream of the gas generators, the fans are positioned in the continuation of the fuselage of the aircraft and are generally fed by an annular ring connected thereto, so as to absorb at least part of the boundary layer formed around the fuselage. The diameter of the fans is approximately equal to that of the fuselage over the largest cross section thereof. The rotational speed of the fans is generally lower than that for conventional turbine engines, in particular so that the blade tip speed is subsonic.

The two fans constitute a propulsion assembly having a low compression rate and a high flow rate. In such a case, the operation and operability of said propulsion assembly are particularly sensitive to the airflow input conditions in the nacelle, in particular the orientation and homogeneity thereof.

The object of this invention is to provide a solution for adapting at least some of the parameters of the flow entering the nacelle to suit the operating conditions of the propulsion assembly.

DESCRIPTION OF THE INVENTION

For this purpose, the invention relates to an aircraft comprising a fuselage and a propulsion assembly, said propulsion assembly comprising at least one fan rotor placed at the rear of the fuselage, in the continuation thereof along a longitudinal axis, and a nacelle forming a fairing of said at least one fan rotor, through which an airflow passes, said aircraft being characterised in that it comprises a plurality of radial stator arms mounted upstream of said at least one fan rotor and extending between the fuselage and the nacelle, said radial arms comprising at least one variable-pitch movable portion designed to axially deflect said airflow, the variable-pitch movable portions being positioned at the intake of the nacelle.

The invention achieves this object by deflecting the airflow entering the fan rotor which allow to correct non-homogeneities or distortions of said airflow, created in particular during the travel thereof along the fuselage of the aircraft.

The pitch of the radial arms can also have the effect of rectifying the flow upstream of the fan rotor in order to improve the efficiency of the propulsion assembly.

Advantageously, the aircraft further comprises individual means for adjusting the pitch of the movable portion of the radial arms, so as to enable a pitch that can be adapted according to a circumferential non-homogeneity of said airflow upstream of the propulsion assembly.

The adaptive pitch can be used to improve the operability of the propulsion assembly according to the flight conditions of the aircraft.

Preferably, the movable portions of the radial arms pivot about axes which extend radially from the fuselage substantially from the same plane transverse to the longitudinal axis, in order to allow for a homogeneous deflection of the incident airflow before the passage thereof into the fan rotor.

Advantageously, at least one control ring, preferably located inside the fuselage, and one assembly of at least two connecting rods connecting said at least one control ring to each of said movable portions.

According to one feature of the invention, the aircraft comprises a plurality of supporting arms designed to support the nacelle and comprising the variable-pitch movable portions.

Preferably, the plurality of radial arms comprises at least a plurality of supporting arms, designed to support the nacelle.

The use of a plurality of upstream supporting arms increases the homogeneity and symmetry of the absorption of the forces supported by the nacelle. The stiffness thereof can thus be reduced, which contributes to reducing the mass of the assembly.

The plurality of radial arms can comprise at least a plurality of radial vanes forming said movable portion as a whole.

Said movable radial vanes have a chord that is smaller than that of the supporting arms. The vanes therefore have a smaller wake and can be present in greater numbers in order to more precisely homogenise the flow entering the nacelle.

Advantageously, the plurality of radial arms comprises at least a plurality of radial arms comprising blowing means designed to blow, into the environment around a trailing edge of said radial arms, an additional airflow supplementing said airflow in the continuation of the trailing edge.

Blowing air into the continuation of the trailing edge makes it possible to limit the localised slowing down of the flow linked to the arm, called the "wake", by re-energising the flow. In particular, said wake is a significant source of noise when the blades of the fan rotor meet it downstream. By reducing the wake, the noise generated by the propulsion assembly of the aircraft is also reduced.

Said blowing means can be arranged so as to blow said additional airflow outside said radial arms, upstream of a variable-pitch movable portion.

Advantageously, said fan rotor has an outer diameter that is substantially equal to a maximum diameter of the fuselage, which allows the rotational speed to be kept slow while circulating a high flow of air, and allows a large portion of the boundary layer that develops on the fuselage of the aircraft to be ingested. Preferably, the rotational speed of said at least one fan rotor is less than 340 m/s at the outer periphery of said fan rotor.

The appearance of high speeds when the blades of the fan rotor deflect air can be avoided while obtaining high thrust by means of the circulated airflow. The noise pollution and propulsive losses are thus limited.

Preferably, said aircraft comprises a turbine engine comprising at least one gas generator designed to generate a primary flow, which is carried by a central flow path to at least one power turbine, said power turbine being positioned at the rear of the fuselage in the continuation thereof and driving, at its periphery, said at least one fan rotor.

BRIEF DESCRIPTION OF THE FIGURES

This invention will be better understood and other details, features and advantages of this invention will become clearer after reading the following description of a non-limiting example, provided with reference to the accompanying figures, in which.

DESCRIPTION OF ONE EMBODIMENT

The Aircraft and the Turbine Engine

Figure 1:
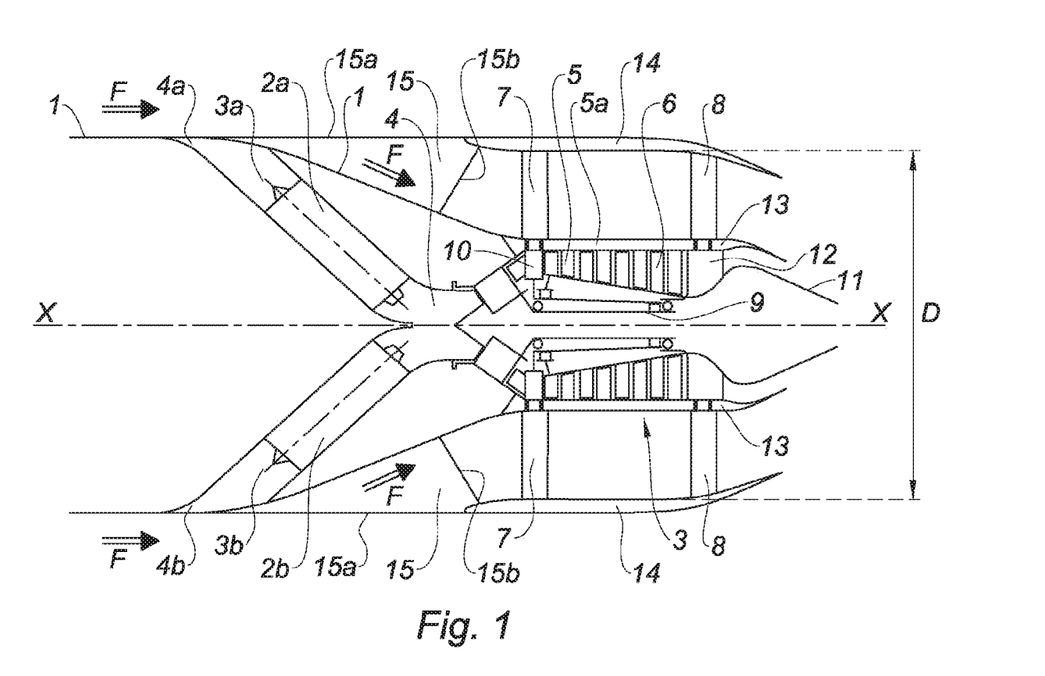
FIG. 1 is a diagrammatic longitudinal section through the rear portion of an aircraft according to the invention together with the propulsion assembly thereof.
Figure 2:
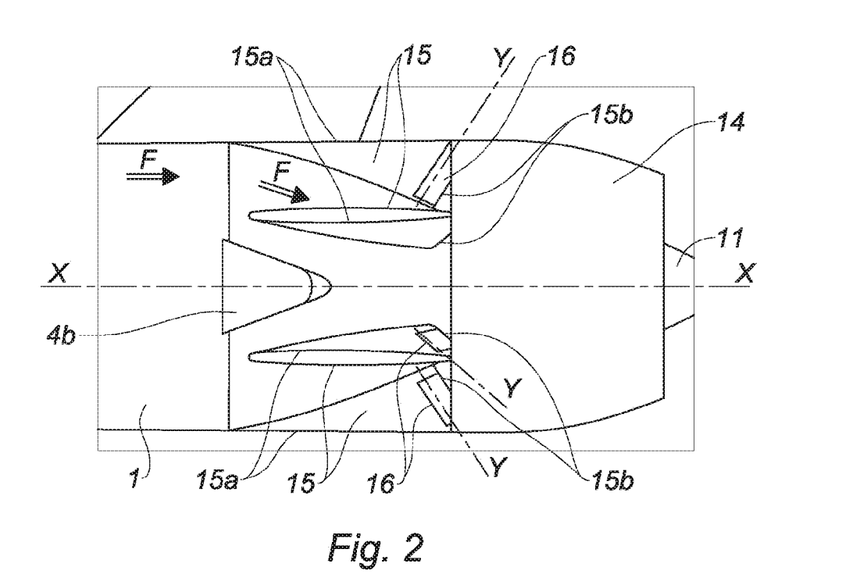
FIG. 2 is a diagrammatic side view of the rear portion of an aircraft according to the invention together with the propulsion assembly thereof.

The invention in particular applies to an aircraft such as an aeroplane comprising a turbine engine of the type shown in FIG. 1 or FIG. 2.

As shown in FIG. 1, the turbine engine is centred on the longitudinal axis XX of the fuselage 1 of the aircraft. Said turbine engine comprises, in an upstream to downstream direction, in the direction of flow of the gases, two separate gas generators 2a, 2b simultaneously feeding a single power turbine 3. The turbine engine is installed at the downstream end of the fuselage 1 of the aircraft.

In this document, the terms "axial" and "radial" refer to the axis XX of the fuselage and turbine engine. Similarly, the terms "upstream" and "downstream" refer to the main direction of flow along said axis.

In a known manner, each gas generator 2a, 2b comprises at least one compressor, one combustion chamber and at least one turbine (not shown in the figures).

Each gas generator 2a, 2b is housed inside a primary flow path 3a, 3b. Separate air intakes 4a, 4b are provided for said flow paths 3a, 3b in order to feed each gas generator 2a, 2b.

In the configuration shown in FIG. 1, said air intakes 4a, 4b are connected to the fuselage 1 of the aircraft, upstream of the gas generators 2a, 2b. More specifically, the inner wall thereof is directly incorporated into the fuselage 1 of the aircraft.

In other configurations, not shown herein, the air intakes 4a, 4b can be distanced from the fuselage to feed the compressors of the gas generators 2a, 2b with a flow that is less disrupted by the boundary layer on the fuselage 1. More than two gas generators, for example three gas generators, can also be used to feed the power turbine 3.

In any case, the air intakes 4a, 4b are designed to limit the disruptions that they may create downstream on the flow F travelling along the fuselage 1 and entering a propulsion assembly described hereinbelow. Moreover, the intakes are located, in this instance, at the start of the portion of the fuselage 1 that narrows as it extends towards said propulsion assembly, in order to distance them from said assembly.

Preferably, the two primary flow paths 3a, 3b of the gas generators 2a, 2b converge on the longitudinal axis XX and together form a V that opens out in the upstream direction, the apex angle of which preferably lies in the range of from 80° to 120°.

The two primary flow paths 3a, 3b of the gas generators 2a, 2b converge into a central primary flow path 4 which feeds the power turbine 3. A mixer (not shown in the figures) is preferably positioned at the convergence zone of the two flow paths 3a, 3b housing the gas generators 2a, 2b. The purpose of said mixer is to mix the gaseous flows originating from the two gas generators 2a, 2b in order to create a single, homogeneous gaseous flow at the outlet of the central primary flow path 4.

The power turbine 3, which is fed with said primary flow at the outlet of the central flow path 4, is placed in the continuation of the fuselage 1. It is equipped with two contra-rotating turbine rotors 5, 6 in order to drive, in a contra-rotating manner, two fan rotors 7, 8. Said turbine rotors 5, 6 are coaxial and centred on the longitudinal axis XX. They rotate about an inner casing 9 secured to the structure of the aircraft.

In this case, a first turbine rotor 5 corresponds to blades connected to a tubular body 5a separating the primary flow path, in the power turbine 3, from the secondary flow path, in which the fan rotors 7, 8 are located. The blades and the tubular body 5a of the first rotor 5 are connected to the bearings for supporting the rotor 5 on the inner casing 9 by supporting arms 10 which cross the primary flow path upstream of the power turbine 3.

Using the same example, the second rotor 6 corresponds to blades that are connected to a radially-inner wall of the primary flow path in the turbine 3 and inserted longitudinally between the blades of the first rotor 5.

Downstream of the power turbine 3, the radially-inner portion of the second rotor 6 is extended by a central body 11. It is also connected by supporting arms 12 to a ring 13 for supporting the blades of the downstream fan rotor 8. Moreover, said ring 13 extends the tubular body 5a of the first rotor 5 and comprises an extension extending backwards, so as to form, together with the central body 11, a primary exhaust nozzle, at the outlet of the power turbine 3.

In the example shown, the propulsion assembly is formed by two fan rotors 7, 8 ducted by a nacelle 14 secured to the structure of the aircraft. The fan rotors have an outer diameter D that is similar to the largest outer diameter of the fuselage 1 of the aircraft.

In this case, a first, upstream fan rotor 7 is positioned at the intake of the power turbine 3. It is connected to the first rotor 5 of the turbine 3 at the arms 10 that provide upstream support to the outer cylindrical body 5a. Said upstream fan rotor 7 therefore rotates at the same speed as the first rotor 5 of the power turbine 3.

Using the same example, the second, downstream fan rotor 8 is positioned at the outlet of the power turbine 3. It is connected to the second rotor 6 of the turbine 3 at the supporting ring 13 and the arms 12 providing support thereto. Said downstream fan rotor 8 therefore rotates at the same speed as the second rotor 6 of the power turbine 3.

Given that the air entering the fans 7, 8 is partially composed of the boundary layer of the fuselage of the aircraft, the input speed is low compared to that of conventional turbine engine fans and the output speed is also lower at an identical compression rate, which improves the propulsive and acoustic performance levels of said fans. Moreover, the high outer diameter D of the fans 7, 8 means that the rotational speed thereof, like that of the rotors 5, 6 of the power turbine 3, will also remain low compared to a conventional turbine engine.

Moreover, in an alternative embodiment (not described), the power turbine 3 can be composed in a known manner of a single rotor and a stator, the thruster only having a single fan associated with said rotor.

Nacelle Support

With reference to FIG. 2, the nacelle 14 can be supported by a plurality of supporting arms 15 distributed circumferentially, typically between three and six arms, connecting the nacelle upstream of the first fan rotor 7 to an immovable structure of the aircraft 1. The supporting arm extends the nacelle 14 from the fans to the fuselage. Multiplying the number of supporting arms 15 increases the homogeneity and symmetry of the absorption of the forces supported by the nacelle 14. The stiffness thereof can thus be reduced, which contributes to reducing the mass of the assembly.

However, it is desired to reduce the disruptions caused by the supporting arms 15 to the flow F entering the nacelle 14, in addition to the drag thereof. Said supporting arms 15 thus comprise a moulded cowling forming a radial vane which extends from the fuselage 1 of the aircraft to the nacelle 14. In the example shown in FIG. 2, said vane has a substantially trapezoidal shape between a lower elongate base, at the point where it meets the fuselage 1, and a short outer base, at the point where it meets the nacelle 14. In the upstream direction, according to the direction of flow F entering the nacelle 14, the vane has a leading edge 15a that connects the fuselage 1 and the nacelle 14 in a direction that is substantially parallel to the axis XX. In the downstream direction, the trailing edge 15b thereof, which is substantially transverse to the flow F entering the nacelle 14, follows a direction that forms an angle close to a right angle with the fuselage 1.

Arm with Movable Flap

Figure 3:
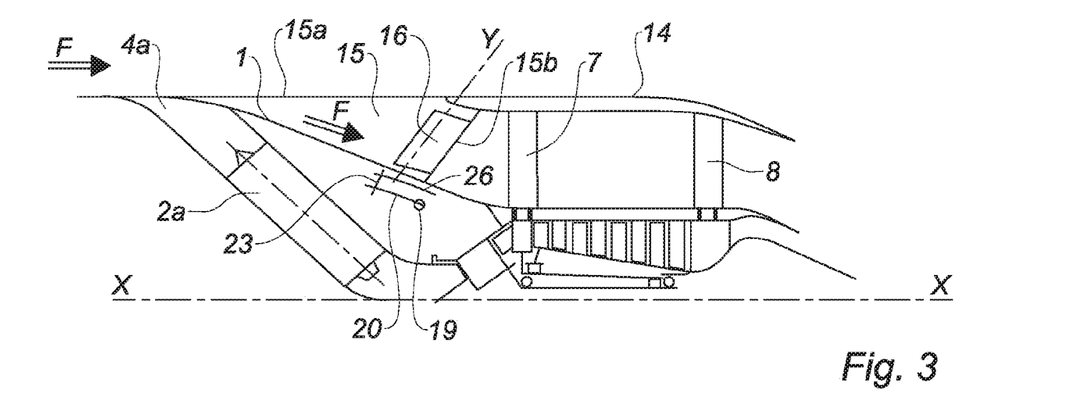
FIG. 3 is a diagrammatic view of the rear portion of an aircraft according to the invention together with the propulsion assembly thereof, according to a longitudinal section through a plane passing through a supporting arm equipped with a movable flap.

With reference to FIGS. 2 and 3, according to a first aspect of the invention, the supporting arms 15 of the nacelle 14 can be provided with flaps 16 at the trailing edge 15b thereof. Each of said flaps can rotate about an axis Y that is substantially radial and parallel to the trailing edge 15b and extends substantially over the span of the supporting arm 15. The flaps are positioned at the intake of the nacelle as shown in FIG. 3.

The flow F feeding the fan rotors 7, 8 is deflected upstream, while travelling along the fuselage 1, by variations in the shape of the fuselage, as well as by elements connected to said fuselage that are not shown, for example the wings. Making a trailing edge flap 16 movable allows said flow F to be oriented before the fan rotor 7 and allows the incidence experienced by the fan rotor and the related distortion to be minimised. Given the fact that the two fan rotors 7, 8 constitute a propulsion assembly having a low compression rate and a high flow rate, the minimisation of the distortions of the airflow entering the nacelle 14 can significantly improve the operation and operability of said propulsion assembly.

As shown in FIG. 3, said movable flaps 16 extend over the majority of the span of the supporting arm 15, so as to orient the entire flow entering the nacelle 14. In FIG. 3, the movable flap 16 has a substantially constant chord according to the span, but it is not limited thereto. The chord of the movable flap can, for example, increase in the direction from the fuselage 1 to the nacelle 14 if it is beneficial to more significantly modify the flow F towards the radial end of the blades of the upstream fan rotor 7.

The pitch angle of the movable flaps 16 can be adjusted in a collective manner, with the same value for all supporting arms 15, or in an individualised manner, by adapting the value to suit the azimuth position of each supporting arm 15. This second option allows for conditions in which the propulsion assembly is fed by a non-symmetrical flow F, for example in the case of a cross wind.

The adjustment of the pitch angle of the movable flaps 16 can also vary in time and depend on the variations in the propulsion assembly feed conditions. In the case of a cross wind for example, this allows the intensity or direction variations thereof to be taken into consideration.

Movable Radial Vane

Figure 4:
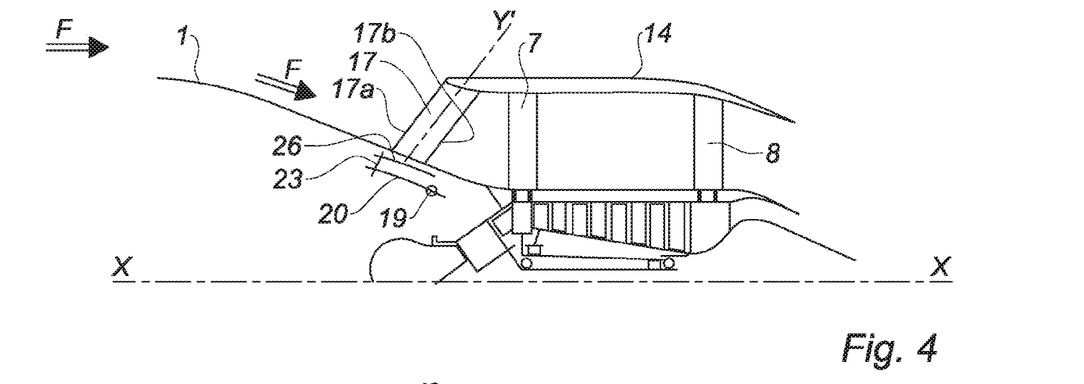
FIG. 4 is a diagrammatic view of the rear portion of an aircraft according to the invention together with the propulsion assembly thereof, according to a longitudinal section through a plane passing through a movable radial vane.

In an alternative embodiment, shown in FIG. 4, variable-pitch radial stator vanes 17 connecting the fuselage 1 to the nacelle 14 can be positioned in the azimuth direction between the supporting arms 15, preferably at the same axial level as the movable flaps 16 of said arms. Said vanes can rotate, each about an axis Y' having an inclination relative to the axis XX that is substantially equal to that of the rotational axes Y of the movable flaps 16 of the supporting arms 15. The vanes are positioned at the intake of the nacelle 14.

In this case, the radial stator vanes 17 do not perform any structural function for supporting the nacelle 14. In this example, each radial stator vane 17 has an elongate shape, preferably three-dimensional, extending in a radial direction. Each radial stator vane 17 preferably has a chord that is substantially constant over the length thereof and substantially equal to that of the movable flaps 16 on the supporting arms 15. Preferably, each radial stator vane 17 forms an aerodynamic body having a leading edge 17a and a trailing edge 17b so as to deflect any incident airflow F received by the radial stator vane 17.

In this case, the pitch of the radial vanes 17 can be adjusted and, possibly, controlled, in an individual or collective manner, in the same way as described for the movable flaps 16 of the supporting arms 15. All of the radial vanes 17 and the movable flaps 16 thus form a ring of variable-pitch radial stator arms at the intake of the nacelle 14.

In the example shown, with the contra-rotating fan rotors 7, 8, the increase in the number of variable-pitch profiles allows the non-homogeneities in the flow F entering the nacelle 14 to be more precisely corrected, whereby the number of supporting arms 15 is reduced. The values of the pitch angles of the movable flaps 16 and of the radial vanes 17 preferably vary within a range of low values, typically less than an absolute value of 15°.

Case of a Single Fan

In the case (not shown) where the propulsion assembly comprises a single fan rotor in the nacelle 14, the set of variable-pitch radial arms, formed by the movable flaps 16 and the variable-pitch radial vanes 17, can act as an intake guide wheel. More specifically, the plurality of movable flaps 16 and of variable-pitch stator vanes 17 mounted upstream of the fan rotor allow the incident airflow F to be deflected such that the deflected airflow F comprises an axial and tangential component. Subsequently, the deflected airflow F is axially rectified by the blades of the fan rotor and compressed such that the airflow exiting the nacelle 14 advantageously only comprises a predominantly axial component.

Preferably, the number of variable-pitch profiles, radial vanes 17 and movable flaps 16 that such a rectifying assembly comprises is at least equal to twenty. Moreover, in order to obtain a rectifying effect, the pitch of the radial vanes 17 and of the movable flaps 16 depends on the fan rotor, but must be at least 15°, while normally remaining less than 65°.

Similarly, when taking into consideration an aerodynamic criterion known as "spacing", which is defined by the ratio of the chord length of the movable flaps 16 or radial vanes 17 over the distance between two adjacent movable flaps 16 or radial vanes 17 at the head, the value of the "spacing" is greater than 0.8, to obtain a rectifying effect. By comparison, for the supporting arms 15, a "spacing" value of less than 0.5 is sought in order to minimise the interference of the incident flow F.

Additional Information on Pitch Adjustment Systems

Several devices can be installed in order to obtain an adaptive and individual pitch of the movable flaps 16 and/or radial vanes 17 about their respective rotational axes Y, Y'. One embodiment of the means for individually adjusting the pitch of the movable flaps 16 and/or of the radial vanes 17 is given herein as a non-limiting example for illustration purposes.

In this example, with reference to FIGS. 3 and 4, the means for individually adjusting the variable pitch are preferably located on a fixed structure (not shown) inside the fuselage 1.

Figure 5:
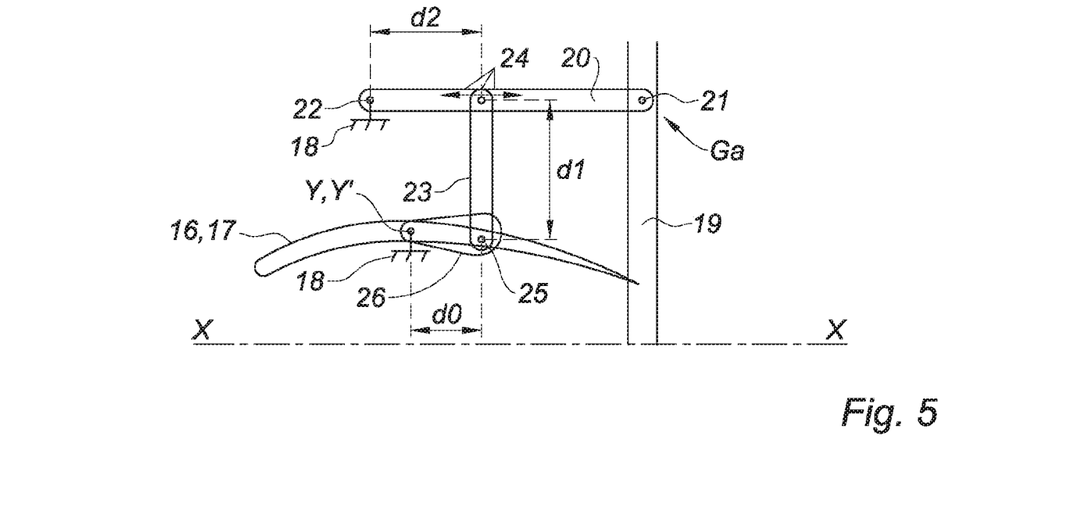
FIG. 5 is a diagrammatic view of the device for adjusting the pitch of a movable arm flap or of a radial stator vane applicable in the invention.

In this example, with reference to FIG. 5, each movable flap 16 and/or radial vane 17 is mounted such that it rotates about its rotational axis, also referred to as the pitch axis Y, Y', said pitch axis Y, Y' being secured to a pivot means rigidly connected to a fixed structure 18 of the aircraft. Moreover, a control ring 19 is mounted such that it can rotate about the longitudinal axis X-X relative to the fixed structure 18 of the aircraft.

A first connecting rod 20 is mounted, at one of its ends, such that it rotates about a substantially radial first pivot shaft 21 that is rigidly connected to the control ring 19, and mounted, at its other end, such that it rotates about a second substantially radial pivot shaft 22 that is mounted on the fixed structure 18 of the aircraft.

The first pivot shaft 21 can be, for example, a pin inserted into a longitudinal slot at the end of the connecting rod 20. In this manner, when the control ring 19 rotates, the displacement of the pin can rotate the connecting rod 20 about the second pivot shaft 22.

The second pivot shaft 22 of the first connecting rod 20 is offset in the azimuth direction relative to the pitch axis Y, Y' of the movable flap 16 or of the radial vane 17 and, in this case, upstream of said pitch Y, Y'.

In this example, the first connecting rod 20 is substantially aligned with the longitudinal axis X-X, and is thus substantially perpendicular to the control ring 19 for a position Ga thereof, corresponding to an average pitch of the movable flap 16 or of the radial vane 17.

A second connecting rod 23 is mounted such that it pivots on the first connecting rod 20 about an articulation shaft 24 between the two connecting rods, close to one of the ends thereof. Means for supporting said articulation shaft 24 can be designed such that the articulation shaft 24 can be displaced on the first connecting rod 20.

The second connecting rod 23 is articulated, near to its other end, in a pivoting manner about a third pivot shaft 25 mounted on the movable flap 16 or on the radial vane 17. The third pivot shaft 25 is placed at a non-zero distance d0 from the pitch axis Y, Y' of the movable flap 16 or of the radial vane 17, so as to provide a lever arm for transforming the displacement of the second connecting rod 23 into a rotational movement of the movable flap 16 or of the radial vane 17, and thus into a modification of the pitch angle thereof. Said offset can be produced by a connecting rod 26 that is immovable relative to the movable flap 16 or the radial vane 17, or by any other means. In this case, the third pivot shaft 25 is located substantially on the chord of the movable flap 16 or of the radial vane 17, without said example being limiting. In the example shown, the third pivot shaft 25 is located downstream of the pitch axis Y, Y' of the movable flap 16 or of the radial vane 17.

Moreover, the second connecting rod 23 is, in this case, mounted such that it is substantially perpendicular to the first connecting rod 25 for a position of the control ring 24 corresponding to an average pitch of the movable flap 16 and/or of the radial vane 17.

With such an assembly, in order to vary the pitch angle of each movable flap 16 or radial vane 17, a control variable Ga is used, said control variable corresponding to the position of the control ring 19 when it rotates about the axis XX, and two adjustable parameters are used to modify the influence of the control variable Ga depending on the azimuth position of the movable flap 16 and/or of the radial vane 17.

A first parameter corresponds to the distance d1, on the second connecting rod 23, between the third pivot shaft 25 and the shaft 24 for articulation with the first connecting rod 20. This distance d1 has an immediate effect, as can be determined from FIG. 5, on the pitch angle of the movable flap 16 and/or of the radial vane 17 for a given position Ga of the control ring 19. This distance d1 can be modified, for example, by changing the second connecting rod 23.

The second parameter relates to the distance d2, on the first connecting rod 20, between the second pivot shaft 22 and the shaft 24 for articulation with the second connecting rod 23. This second parameter d2 is more particularly linked to a multiplication factor of the amplitude of the variations in the pitch angle of the movable flap 16 or of the radial vane 17 compared to the variations in the position Ga of the control ring 19. The reduction of the distance d2 results in a reduction of the amplitudes of the pitch angle for the same displacement Ga of the control ring 19, and vice-versa.

Such a device can be used to correct the non-homogeneities of the boundary layer ingested by the fan rotors 7, 8. A lesser level of distortion caused by the ingestion of the boundary layer at low speed (take-off or landing) is observed and, conversely, a higher level of distortion in cruising flight. The pitch of the movable flaps 16 and/or of the radial vanes 17 can therefore be adjusted:

- by linking a first value of the control position Ga with slow flying, for which no azimuth variation in the pitch of the vanes is required, and
- by linking a second value of the control position Ga with cruising flight, for which an azimuth variation in the pitch of the vanes is performed to correct the distortion.

Structural Arms with Blowing Function

Figure 6:
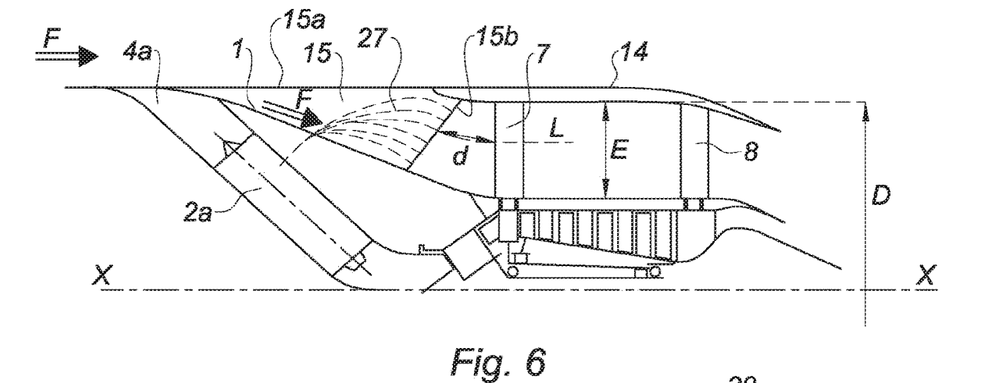
FIG. 6 is a diagrammatic view of the rear portion of an aircraft according to the invention together with the propulsion assembly thereof, according to a longitudinal section through a plane passing through a supporting arm equipped with a blowing device.

According to another aspect of the invention, with reference to FIG. 6, the supporting arms 15 can be equipped with devices for blowing an additional airflow Fs at the trailing edge 15b thereof. Advantageously, said air is, in this example, taken at the compressors or gas generators 2a and carried to the blowing devices via ducts 27 passing within the supporting arms 15.

Blowing an additional airflow Fs makes up for the speed deficit, ideally the entire deficit, caused by the boundary layer that forms along the cowling of the arm, in the flow F entering the nacelle 14. It eliminates or significantly reduces the wake that forms behind the supporting arm 15.

The interaction of this wake with the blades of the fan rotors 7, 8 that rotate there behind is a significant source of noise. Typically, the noise created by said interactions can be broken down into a tonal component and a broadband component.

The tonal component corresponds to the interaction between the average wake and, mainly, the first fan rotor 7. Said component appears at frequencies specific to the upstream fan rotor 7. A significant increase in the noise levels is observed at the fundamental operating frequency of the blades of the rotor 7 and at the harmonics thereof.

The broadband component mainly corresponds to the interaction between the turbulent structures contained in the wake of the supporting arm 15 and the leading edge of the blades of the fan rotor 7.

Aviation standards are in particular aiming to reduce the value of this noise level in the far field in order to limit noise pollution, and said standards issue restrictions regarding the value thereof by measuring their impact on the environment. The assessment of the perceived noise corresponds to a weighting of the intensity depending on the frequencies and is measured in the unit EPNdB (effective perceived noise in decibels). For information, tests show that an immovable arm placed in front of a pair of unducted contra-rotating propellers can lead to a penalty of about 6 EPNdB on the noise emitted by an aircraft. By way of compensation, it has been estimated that this noise impact can be partially reduced to 3 EPNdB with a blown airflow at the trailing edge of the arm.

Figure 7A:
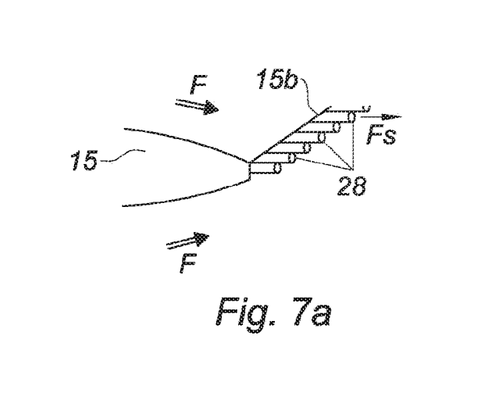
FIG. 7a is a diagrammatic perspective view of a portion of the trailing edge of a nacelle-supporting arm according to the invention, equipped with a first alternative embodiment of blowing means.

In a first embodiment of the blowing devices, with reference to FIG. 7a, the trailing edge 15b of the supporting arm 15 is truncated and allows for the passage of nozzles 28, distributed over the span of the supporting arm 15, for blowing an additional airflow Fs. These nozzles are fed by the aforementioned ducts 27. The spacing of the nozzles 28, the diameter thereof and the shape thereof are arranged, with regard to the airflow rate carried by the ducts 27, in order to create jets that drive the flow so as to compensate for the speed deficit behind the trailing edge 15b and thus minimise the wake of the arm. Advantageously, said nozzles 28 are retractable when there is no blown airflow.

Figure 7B:
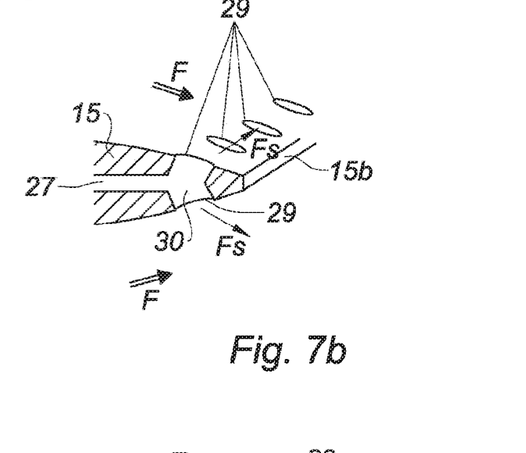
FIG. 7b is a diagrammatic perspective cross-sectional view of a portion of the trailing edge of a nacelle-supporting arm according to the invention, equipped with a second alternative embodiment of blowing means.

In a second embodiment, with reference to FIG. 7b, discharge ports 29 for the additional blown airflow Fs are distributed, in this case on each surface of the profile of the supporting arm 15, upstream of the trailing edge 15b. Said discharge ports 29 can take on the shape of ovoid holes or slots elongated in a substantially parallel manner to the trailing edge 15b. The air feed ducts 27 open out into an inner cavity 30 that communicates with the discharge ports 29. In this device, the additional blown airflow Fs leaving through the discharge ports 29 is quickly pushed back along the wall of the supporting arm 15, and the injected airflow compensates for the speed deficit behind the trailing edge 15b. The shapes of the inner cavity 30 and of the discharge ports 29 are arranged so as to optimise this phenomenon.

In this design, the extension of the blowout ports 29 along the chord of the profile of the supporting arm 15 is preferably approximately the thickness of the boundary layer that develops in the flow F around said profile. Typically, for a chord length of 1 m on the supporting arm 15 of the nacelle 14 and a turbulent boundary layer, the extension of the blowout ports 29 along the chord is about 5 to 10 cm. The extension along the longitudinal axis XX of the blowout ports 29 located at a given radial distance from said axis XX therefore preferably lies in the range of from 5% to 10% of the chord length of the supporting arm 15 at said radial distance.

Moreover, the trailing edge 15b of the supporting arms 15 is preferably at a sufficiently great distance from the upstream fan rotor 7 so that the blown airflow jet mixes with the main flow F bypassing the supporting arm 15 and reduces the wake effect. In this case, this distance is measured by a distance d taken between the trailing edge 15b and the upstream fan rotor 7 along a streamline L passing at a certain percentage of the span of the blades of the upstream fan rotor 7. Typically, this distance d is about 15% of the diameter D of the upstream fan rotor 7 at 70% of the span E of the blades thereof.

Advantageously, the assembly further comprises means for varying the flow rate of the blown airflow depending on the position in the spanwise direction E and/or for regulating said flow rate in time.

According to a first alternative embodiment, one or more valves (not shown) can be placed on the ducts 27 feeding the nozzles 28 or the discharge ports 29. The opening of each valve can be controlled in order to control the airflow rate passing through in the one or more ducts 27 to which it is connected. The rate of the airflow Fs blown by the corresponding nozzles 28 or discharge ports 29 is therefore adjusted in an individual or collective manner depending on the positions thereof on the span of the supporting arm 15.

Figure 8A:
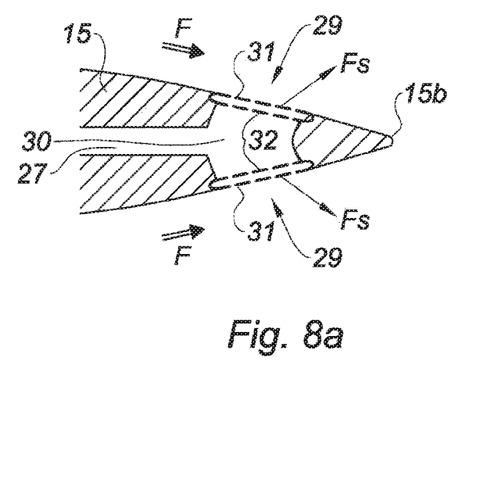
FIG. 8a is a diagrammatic cross-sectional view near the trailing edge of a nacelle-supporting arm according to the invention, equipped with a third alternative embodiment of blowing means, placed in a first position.
Figure 8B:
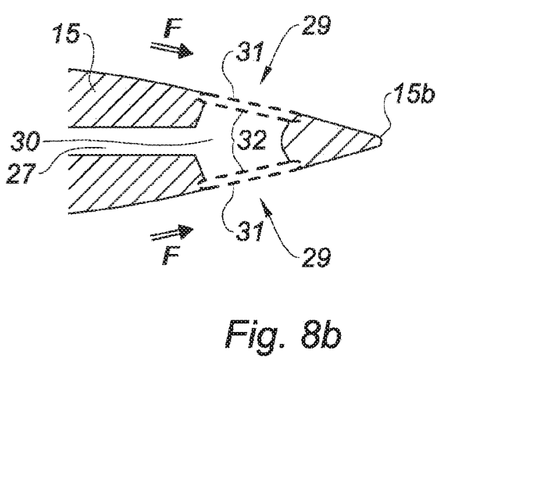
FIG. 8b is a diagrammatic cross-sectional view near the trailing edge of a nacelle-supporting arm according to the invention, equipped with a third alternative embodiment of blowing means, placed in a second position.

With reference to FIG. 8a, 8b, a second alternative embodiment is applicable, preferably, in the case where the discharge ports 29 form slots parallel to the trailing edge 15b, regardless of whether this takes place in a continuous or discontinuous manner. In this alternative embodiment, a discharge slot 29 is covered by a first, immovable grid 31 and by a second grid 32 that is movable in translation along the surface of the profile of the supporting arm 15. The two grids 31, 32 advantageously have a substantially identical geometry, in particular with regard to the geometry of the orifices thereof and of the bars separating them. In this example, the first grid 31 is an outer grid and the second grid 32 slides beneath the first grid. The position of the second grid 32 is controlled by an actuator that is not shown in the figures.

In a first position of the second grid 32, with reference to FIG. 8a, the orifices of the two grids 31, 32 are superimposed on one another. The discharge slot 29 therefore allows for the passage of a maximum flow rate of the blown airflow Fs that is compatible with the feeding conditions via the duct 27.

In a second position of the second grid 32, with reference to FIG. 8b, the orifices of each grid 31, 32 are located opposite the bars of the other grid. Advantageously, this overlaying completely closes the passage through the discharge slot 29 for the airflow flowing via the feed duct 27.

By controlling the translational movement of the grid 32 between the first and the second position, the flow rate of the blown airflow Fs through the discharge slot 29 can be varied, in a substantially continuous manner, between a minimum value and a maximum value.

In one specific embodiment, it is possible to separate the grids 32, 31, and potentially the slots 29 too, into a plurality of portions along the span of the trailing edge 15b and to control the translational movement of the movable grids 32 in a differentiated manner. It is therefore possible to modulate the blown airflow rate at the trailing edge 15b in time and space.

The modulation of the flow rate of the blown airflow Fs according to the span allows air to be blown mainly on the radially outer side of the trailing edge 15b, where flow is the fastest.

The modulation of the flow rate of the blown airflow Fs in time makes it possible to adapt to the flight conditions and, where necessary, to minimise engine losses by reducing the flow rate of the blown airflow Fs.

Fan-Guide Vane Assembly Pairing

Advantageously, the aforementioned blowing means can be installed in combination with the movable flaps 16 on the supporting arms 15.

Figure 9A:
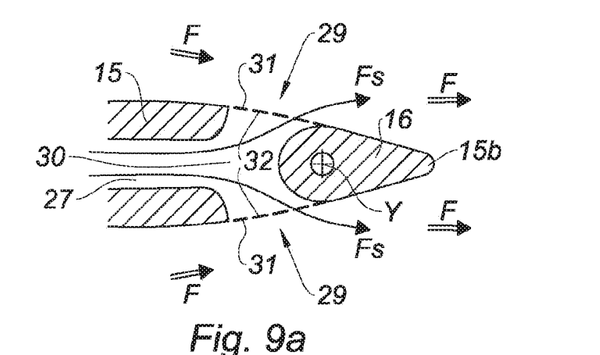
FIGS. 9a and 9b are diagrammatic cross-sectional views near the trailing edge of a nacelle-supporting arm according to the invention, equipped with a third alternative embodiment of blowing means, corresponding to FIG. 8a or 8b, combined with a movable flap with and without incidence.
Figure 9B:
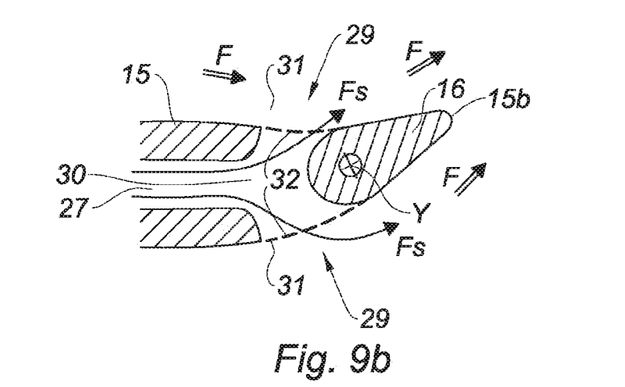

With reference to FIG. 9a, 9b, the discharge ports 29 are placed in front of the movable flap 16. In this case, the movable flap 16 closes, in the downstream direction, the cavity 30 feeding the discharge ports 29, which are present in the form of slots. The trailing edge of the movable flap 16 is also the trailing edge 15b of the supporting arm 15.

In the example shown, the slot systems 31, 32 that can be offset in order to modulate the flow rate of the blown airflow Fs through the slot 29 are installed in accordance with the description provided with reference to FIG. 8a, 8b.

With reference to FIG. 9a, when the movable flap 16 is aligned in the general axis of the profile of the supporting arm 15, the device for blowing an additional airflow Fs operates in a similar manner to that described with reference to FIG. 8b or 8a, in order to limit the wake of the supporting arm 15 in the continuation thereof.

With reference to FIG. 9b, when the movable flap 16 is rotated by a given pitch angle, it deflects the general flow F and therefore the wake thereof by an angle substantially equal to the pitch angle thereof. The airflow Fs blown through the slots 29 on either side of the supporting arm 15, upstream of the movable flap 16, still leaves said slots 29 with the same incidence. However, the pressure effects on the pressure face of the movable flap 16 and the suction effects on the suction face drive the blown airflow Fs into the main flow F, according to the orientation of the pitch of the movable flap 16. The blowing produced by the slots 29 therefore continues to perform its function of reducing the speed deficit in the wake of the supporting arm 15.

Moreover, when variable-pitch radial vanes 17 are positioned circumferentially between the supporting arms 15, as shown with reference to FIG. 4, they can also be equipped with blowing means. In such a case, it may also be advantageous to install therein devices such as those described for the supporting arms 15 without any movable flap 16 with regard to the configurations in FIGS. 7b or 8a and 8b. Blown air feed ducts 27 can pass through at the pitch axis Y'. In this case, it should be noted that the small chord of the variable-pitch radial vanes 17 reduces the wake effect thereof relative to the supporting arms 15 and thus reduces restrictions regarding the dimensioning of the blowing devices.

The invention claimed is:

1. An aircraft comprising:
a fuselage having a rear;
a propulsion assembly comprising at least one fan rotor placed at the rear of the fuselage, in the continuation thereof along a longitudinal axis, and a nacelle forming a fairing of said at least one fan rotor, through which an airflow passes and,
a plurality of radial stator arms mounted upstream of said at least one fan rotor and extending between the fuselage and the nacelle,
said plurality of radial stator arms comprising at least one variable-pitch movable portion configured to axially deflect said airflow, the variable-pitch movable portions pivoting about axes which extend radially from the fuselage substantially from the same plane transverse to the longitudinal axis and being positioned at the intake of the nacelle,
wherein the nacelle comprises an upstream edge and each radial stator arm comprises a leading edge linked to said upstream edge and to the fuselage;
wherein the plurality of radial stator arms further comprises at least a plurality of supporting arms, configured to structurally support the nacelle, and wherein each supporting arm has a trapezoidal shape; and
wherein the leading edge of each radial stator arm is flush with the upstream edge of the nacelle.

2. The aircraft according to claim 1, further comprising individual members for adjusting the pitch of the movable portion of the radial stator arms, so as to enable a pitch that can be adapted according to a non-homogeneity of said airflow upstream of the propulsion assembly.

3. The aircraft according to claim 2, comprising at least one control ring, located inside the fuselage, and one assembly of at least two connecting rods connecting said at least one control ring to each of said movable portions.

4. The aircraft according to claim 1, wherein the plurality of radial stator arms comprises at least a plurality of radial vanes forming said at least one variable-pitch movable portion as a whole.

5. The aircraft according to claim 1, wherein the plurality of radial stator arms comprises at least a plurality of radial stator arms comprising a blower designed to blow, into the environment around a trailing edge of said radial stator arms, an additional airflow supplementing said airflow in the continuation of the trailing edge.

6. The aircraft according to claim 5, wherein said blower is arranged so as to blow said additional airflow outside said radial stator arms, upstream of a variable-pitch movable portion.

7. The aircraft according to claim 1, wherein said fan rotor has an outer diameter that is substantially equal to a maximum diameter of the fuselage.

8. The aircraft according to claim 1, comprising a turbine engine having at least one gas generator designed to generate a primary flow, which is carried by a central flow path to at least one power turbine, said power turbine being positioned at the rear of the fuselage in the continuation thereof and driving, at its periphery, said at least one fan rotor.

9. The aircraft according to claim 1, wherein each supporting arm of the plurality of supporting arms extends the nacelle from the fans to the fuselage.

10. The aircraft according to claim 9, wherein the supporting arms comprising upstream, a leading edge connecting the fuselage to the nacelle and downstream, a trailing edge substantially transverse to the flow entering the nacelle, the movable portion being situated on the trailing edge of each supporting arms.

11. The aircraft according to claim 1, wherein the supporting arms comprising upstream, a leading edge connecting the fuselage to the nacelle and downstream, a trailing edge substantially transverse to the flow entering the nacelle, the movable portion being situated on the trailing edge of each supporting arms.

12. The aircraft according to claim 1, wherein the supporting arms comprise upstream, a leading edge connecting the fuselage to the nacelle and downstream, a trailing edge substantially transverse to the flow entering the nacelle, the leading edge extending along a direction substantially parallel to the longitudinal axis.

13. The aircraft according to claim 1, wherein the supporting arms comprise upstream, a leading edge connecting the fuselage to the nacelle and downstream, a trailing edge substantially transverse to the flow entering the nacelle, the nacelle comprising an annular upstream edge and the leading edge being linked to annular upstream edge.

14. The aircraft according to claim 1, wherein several supporting arms are distributed circumferentially around the longitudinal axis.

15. The aircraft according to claim 4, wherein said at least a plurality of radial vanes is positioned in the azimuth direction between the supporting arms.

16. The aircraft according to claim 15, wherein the supporting arms are positioned at the same axial level as the movable portion of the radial stator arms.

17. The aircraft according to claim 5, wherein the propulsion assembly comprises a varying device configured to vary a flow rate of the blown through the blower and which depends airflow depending on the position in the spanwise direction of each supporting arms and/or to regulate said flow rate in time.

18. An aircraft comprising:
a fuselage having a rear;
a propulsion assembly comprising at least one fan rotor placed at the rear of the fuselage, in the continuation thereof along a longitudinal axis, and a nacelle forming a fairing of said at least one fan rotor, through which an airflow passes, and
a plurality of radial stator arms mounted upstream of said at least one fan rotor and extending between the fuselage and the nacelle,
wherein said radial stator arms comprise at least one variable-pitch movable portion designed to axially deflect said airflow, the variable-pitch movable portions pivoting about axes which extend radially from the fuselage substantially from the same plane transverse to the longitudinal axis and being positioned at the intake of the nacelle,
wherein the nacelle comprises an upstream edge and each radial stator arm comprises a leading edge linked to said upstream edge and to the fuselage,
wherein said plurality of radial stator arms comprise at least a plurality of supporting arms configured to structurally support the nacelle and at least a plurality of radial stator vanes, said at least a plurality of radial stator vanes positioned in the azimuth direction between the plurality of supporting arms and configured to deflect any incident airflow.

19. An aircraft comprising:
a fuselage having a rear;
a propulsion assembly comprising at least one fan rotor placed at the rear of the fuselage, in the continuation thereof along a longitudinal axis, and a nacelle forming a fairing of said at least one fan rotor, through which an airflow passes, and
plurality of radial stator arms mounted upstream of said at least one fan rotor and extending between the fuselage and the nacelle,
wherein said radial stator arms comprising at least one variable-pitch movable portion designed to axially deflect said airflow, the variable-pitch movable portions pivoting about axes which extend radially from the fuselage substantially from the same plane transverse to the longitudinal axis and being positioned at the intake of the nacelle,
wherein the nacelle comprises an upstream edge and each radial stator arm comprises a leading edge linked to said upstream edge and to the fuselage,
wherein each radial stator arm comprises trailing edge,
wherein the at least one variable-pitch movable portion comprises a flap being arranged and borne at the trailing edge of each radial stator arm, each flap extending rotating about an axis that is substantially radial and parallel to the trailing edge and extends substantially over a span of each radial stator arm,
wherein each flap is positioned at the intake of the nacelle.

20. The aircraft according to claim 1, further comprising at least one gas generator designed to generate a primary flow for feeding at least one power turbine, said at least one power turbine driving said at least one fan rotor each supporting arm surrounding said at least one gas generator.

21. The aircraft according to claim 20, wherein the leading edge of each supporting arm extends radially outside said at least one gas generator which is arranged inside the fuselage.

22. The aircraft according to claim 21, wherein said at least one gas generator comprises at least one compressor, one combustion chamber and at least one turbine.

23. The aircraft according to claim 1, further comprising at least one air intake linked to the fuselage, the air intake being arranged between two upstream portions of adjacent radial stator arms along a circumferential direction.

* * * * *